(12) United States Patent
Weaver et al.

(10) Patent No.: US 10,230,731 B2
(45) Date of Patent: Mar. 12, 2019

(54) AUTOMATICALLY SHARING A DOCUMENT WITH USER ACCESS PERMISSIONS

(71) Applicant: Microsoft Technology Licensing, LLC., Remond, WA (US)

(72) Inventors: Joan Catharine Weaver, Somerville, MA (US); Benjamin Gustav Wilde, Quincy, MA (US); Patrick Michael Gan, Salem, MA (US); Jade Kessler, Cambridge, MA (US); Erin M. O'Connell, North Reading, MA (US); Suzan Marashi, Seattle, WA (US); Derik Stenerson, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 152 days.

(21) Appl. No.: 15/172,058

(22) Filed: Jun. 2, 2016

(65) Prior Publication Data

US 2017/0353466 A1   Dec. 7, 2017

(51) Int. Cl.
*H04L 29/06* (2006.01)
*G06F 17/30* (2006.01)
(Continued)

(52) U.S. Cl.
CPC ............ *H04L 63/101* (2013.01); *G06F 17/24* (2013.01); *G06F 17/30011* (2013.01);
(Continued)

(58) Field of Classification Search
CPC ..... H04L 63/101; H04L 63/10; H04L 63/102; G06F 17/24; G06F 17/30011;
(Continued)

(56) References Cited

U.S. PATENT DOCUMENTS 8,285,788 B1   10/2012   Wang et al.
8,943,140 B1 *  1/2015   Kothari ................. H04L 65/403
                                                                709/203
(Continued)

FOREIGN PATENT DOCUMENTS

WO   2012125338 A1   9/2012

OTHER PUBLICATIONS

"Salesforce Summer '15 Release Notes", Retrieved on: Dec. 23, 2015 Available at: http://releasenotes.docs.salesforce.com/en-us/summer15/release-notes/rn_chatter_files_mentions_in_group_shares.htm.

(Continued)

*Primary Examiner* — Techane Gergiso
(74) *Attorney, Agent, or Firm* — Merchant & Gould P.C.

(57) ABSTRACT

Inline command functionality for automatically sharing a document with user access permissions is provided. Automatic sharing of a document is performed in response to a trigger entry within the document. When a trigger entry and a user identifier entry is received, an auto-share system automatically resolves user access permissions in the background, detects sharing permissions, and shares the document with user access permissions without requiring the user who is sharing the document to manually input data. A notification is provided to the sharing user informing the user that the document is being shared, and another notification is provided to the user with whom the document is being shared including a link to the document. If the document was unintentionally shared, the sharing user is enabled to select the notification, and quickly and easily make modifications to the user access permissions for the document.

17 Claims, 13 Drawing Sheets

(51) Int. Cl.
 *G06F 17/24* (2006.01)
 *G06Q 10/10* (2012.01)
 *G06F 21/62* (2013.01)
(52) U.S. Cl.
 CPC .... *G06F 17/3051* (2013.01); *G06F 17/30867* (2013.01); *G06F 21/6218* (2013.01); *G06Q 10/101* (2013.01); *H04L 63/10* (2013.01); *H04L 63/102* (2013.01)
(58) Field of Classification Search
 CPC ........... G06F 17/3051; G06F 17/30867; G06F 21/6218; G06F 10/101
 See application file for complete search history.

(56) References Cited

U.S. PATENT DOCUMENTS

| | | | |
|---|---|---|---|
| 2006/0224735 A1 | 10/2006 | Hill et al. | |
| 2009/0106247 A1* | 4/2009 | Daughtry | G06F 21/604 |
| 2012/0233544 A1* | 9/2012 | Roy | G06Q 10/10 715/274 |
| 2012/0284345 A1* | 11/2012 | Costenaro | G06Q 10/107 709/206 |
| 2013/0054714 A1 | 2/2013 | Bedi | |
| 2013/0067303 A1 | 3/2013 | Kantor et al. | |
| 2014/0136635 A1 | 5/2014 | Jeng et al. | |
| 2015/0135062 A1* | 5/2015 | Riss | G06F 17/212 715/246 |
| 2016/0330208 A1* | 11/2016 | Chao | G06Q 10/101 |
| 2017/0075919 A1* | 3/2017 | Bose | G06F 21/6245 |
| 2017/0126689 A1* | 5/2017 | Lloyd | G06F 3/04817 |
| 2017/0285895 A1* | 10/2017 | Nathwani | G06F 3/0484 |
| 2017/0300483 A1* | 10/2017 | DeVincenzi | G06F 17/30011 |

OTHER PUBLICATIONS

"Create a Task", Published on: Sep. 10, 2015 Available at: https://www.wrike.com/help/create-task/.

"Podia Help Centre", Published on: May 15, 2015 Available at: https://help.podio.com/hc/en-us/articles/201019768-Sharing-a-single-item.

"What are @mentions and #hashtags?", Retrieved on: Dec. 23, 2015 Available at: https://apps.na.collabserv.com/help/index.jsp?topic=%2Fcom.ibm.cloud.welcome.doc%2Fr_common_mention_hashtag.html.

"Social Intranet Software: Confluence Empowers Collaboration and Innovation", Retrieved on: Dec. 23, 2015 Available at: https://www.atlassian.com/landing/social-intranet-software/.

Keeler, Alice, "Direct Comment to Someone in Google Docs", Published on: Sep. 10, 2014 Available at: http://www.alicekeeler.com/teachertech/2014/09/10/direct-comment-to-someone-in-google-docs/.

"International Search Report and Written Opinion Issued in PCT Application No. PCT/US2017/034097", dated Jul. 26, 2017, 11 Pages.

* cited by examiner

FIG. 2B

AUTOMATICALLY SHARING A DOCUMENT WITH USER ACCESS PERMISSIONS

BACKGROUND

Many documents are written collaboratively. Some online services offer online document storage and editing. Such services provide users with a document repository that may be used to store documents. Users can view and edit the documents using browser-based software, desktop applications, or mobile applications, and can save changes to the documents to the document repository. There are certain aspects to online document services that can make these services cumbersome to use for collaboration, such as when sharing a document with another user who does not have user access permissions. For example, current techniques are not seamless and interrupt the sharing user's workflow by requiring the sharing user to perform a number of steps to enable sharing of a document with another user when the other user does not have user access permissions. As can be appreciated, this can be cumbersome to the sharing user and reduces user interaction efficiency and degrades user interaction performance.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for providing inline command functionality for automatically sharing a document with user access permissions. For example, user interaction efficiency is increased and user interaction performance is improved by providing an auto-share system and method for enabling a user to seamlessly share a document with user access permissions with another user with whom the document is not shared.

In an example, automatic sharing of a document with user access permissions is performed in response to a trigger entry within the document. When a trigger entry associated with a user identifier is received, for example, in a document canvas or in a comment, an auto-share system automatically resolves user access permissions in the background, detects sharing permissions, and shares the document with user access permissions without requiring the user who is sharing the document to manually input data. For example, the sharing user is enabled to share the document with another person without disruption to his/her workflow.

When a document is shared with another user, a notification is provided to the user sharing the document informing the user that the document is being shared, and another notification is provided to the user with whom the document is being shared with a link to the document and a notification that he/she was mentioned in the document. If the document was unintentionally shared, the sharing user is enabled to select the notification, and quickly and easily make modifications to the user access permissions for the document.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 2B is an illustration of an example user interface display showing user input in a comment including a trigger entry and a user identifier entry for automatically sharing a document;

DETAILED DESCRIPTION

Figure 1:
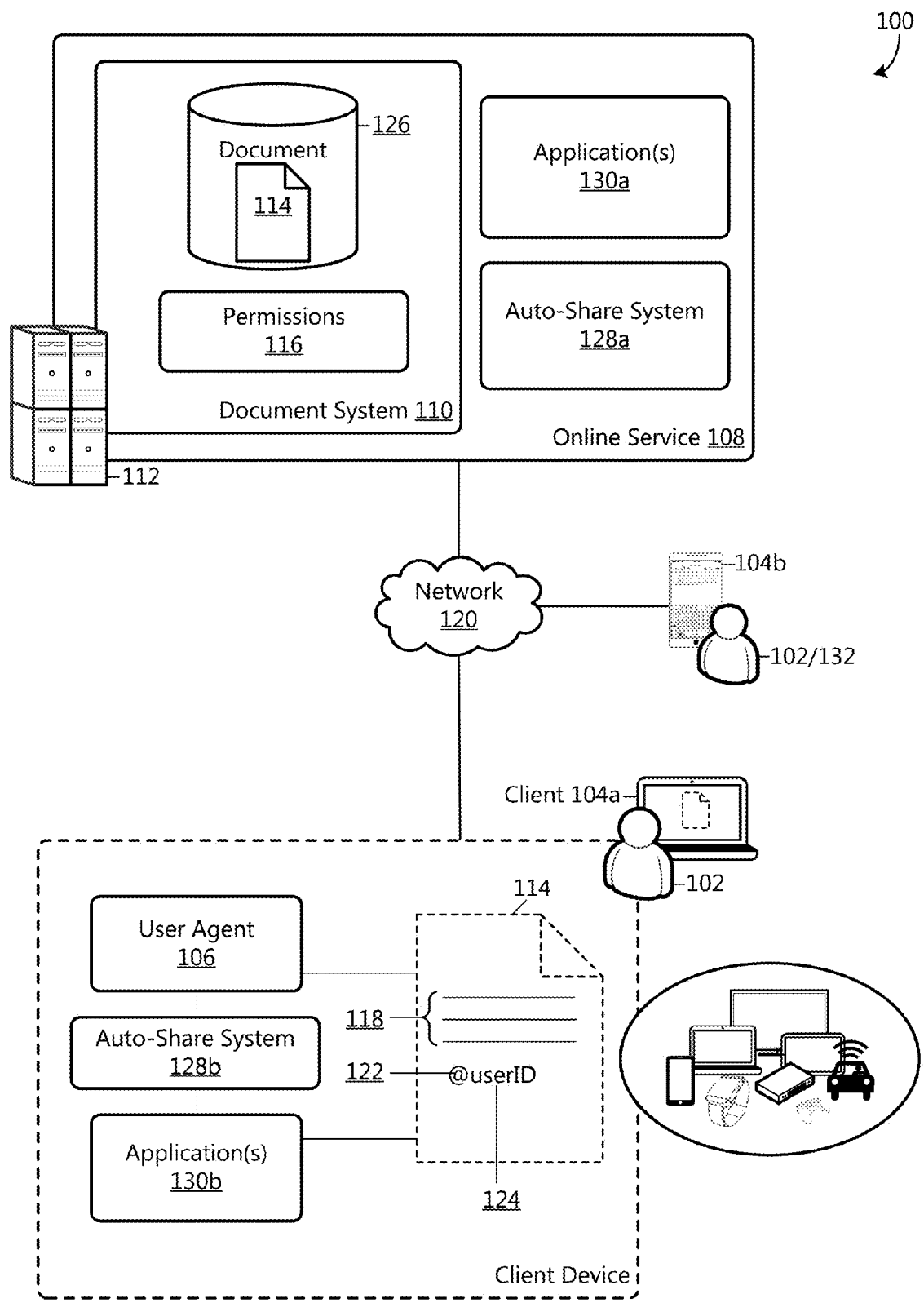
FIG. 1 is a simplified block diagram showing components of an example system for providing inline command functionality for automatically sharing a document with user access permissions.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for providing inline command functionality for automatically sharing a document with user access permissions. Automatic sharing of a document with user access permissions is performed in response to receiving user input including a trigger entry and a user identifier entry within the document. Among other benefits, the disclosed technology enables users to continue with their workflow, while an auto-share system automatically resolves user access permissions in the background, and shares the document with a referenced user without interrupting the sharing user. Advantageously, the inline command functionality allows the user to continue working in the application throughout the permission-checking and automatic sharing so that the user's concentration is not broken by having to confirm sharing the document with a mentioned user or to manually share the document. In some aspects, the auto-share system is configured to process the inline auto-share command in the background while the application continues to receive textual input from the user. Additionally, in some aspects, multiple active inline auto-share commands may be processed simultaneously.

With reference now to FIG. 1, a simplified block diagram illustrating aspects of an example system 100 for providing automatic sharing of a document via a mention. The example system 100 includes an online service 108, illustrative of portal-based computing system for creating, managing and sharing electronic documents. In some examples, the online service 108 is located on a server 112, such as a shared resources server located at an enterprise accessible by various clients 104a,b (collectively, 104). In other examples, the server 112 is a shared resources server remotely located from the various clients 104. According to an aspect, the online service 108 includes a document system 110 operative to provide document storage and/or editing of documents 114. In one example, the document system 110 provides one or more online applications 130a to view, generate, and edit electronic documents 114. According to an aspect, the document system 110 comprises a local or remote storage repository 126 at which the one or more electronic documents 114 are stored.

Electronic documents 114 stored in the storage repository 126 may be associated with various types of user access permissions 116. According to an example, the user access permissions 116 are stored in the document system 110. User access permissions 116 indicate the extent to which a user may edit an electronic document 114. In one example, the user access permissions 116 indicate that an electronic document 114 is public and can be opened and/or edited by anyone. In another example, user access permissions 116 list specific users who may read and/or edit a given document.

Example user access permissions 116 include one or more of: full control, read/write, review only, comment only, read only and no access. Other user access permissions 116 may be possible. According to an example, when a client user is assigned full control, the user has full read/write access to the document 114 and can change the formatting of the document. When a client user has read/write control, the user has read-write permission to the document 114, but cannot make formatting changes. With review only permission, a client user can make changes to the document 114 that are tracked via a track changes technology. With comment only permission, a client user can insert comments into the document 114, but cannot alter content of the document. With read only permission, a client user can view the document 114, but cannot make any changes to it and cannot insert any comments. In some examples, user access permissions 116 can be enforced without network connectivity. For example, assigned user access permissions to a document 114 can be cached in the client's application 130b or stored within the document 114. Accordingly, user access permissions 116 can be used if a client device 104 is disconnected from a network 120.

Client users 102 are enabled to access the server 112 and the electronic documents 114 from a variety of client devices 104a,b via a network 120 or combination of networks, such as, but not limited to, the Internet, wide area networks, local area networks, and combinations thereof. Examples of suitable client devices 104 include, but are not limited to, desktop computers, laptop computers, tablet computers, laptop/tablet hybrid computing devices, large screen multi-touch displays, mobile phones, personal digital assistants, wearable devices, gaming devices, connected automobiles, and smart appliances.

The system 100 includes one or more applications 130a,b (generally, 130) used to view, generate, and edit electronic documents 114. Examples of suitable applications 130 include, but are not limited to, word processing, spreadsheet, database, slide presentation, electronic mail, drawing, note taking, web browser, media player, and game applications. In some examples, the application(s) 130 are web applications 130a run on a server 112 and provided via an online service 108 as described above. According to an aspect, web applications communicate via the network 120 with a user agent 106, such as a browser, executing on a client computing device 104. The user agent 106 provides a user interface that allows a user 102 to interact with application content and electronic documents 114 stored in the storage repository 126. The user interface is displayed on a display of the client device 104 running the user agent 106. In some examples, the user agent 106 is a dedicated client application that provides a user interface and access to electronic documents 114 stored in the storage repository 126. In other examples, the application(s) 130 are local applications 130b stored and executed on the client device 104, and provide a user interface that allows a user 102 to interact with application content and electronic documents 114 stored in the storage repository 126.

A user 102 may use an application 130 to create a new document 114 or to edit an existing document 114. In examples, the application 130 receives input from the user, such as text input, drawing input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user input results in content 118 being added to the document 114. In some examples, content 118 is added within a document canvas (e.g., a page in a word processing document, a spreadsheet in a spreadsheet document, a slide in a presentation document). In other examples, content 118 is added in a comment. According to an aspect, the received user input includes a trigger entry 122 corresponding to an inline command. For example, the trigger entry 122 may operate as a signal to perform a particular action or sequence of actions.

As an example, a trigger entry 122 is associated with an auto-share command, that when successfully completed, automatically shares the document 114 with user access permissions 116 to an identified user. For example, a user 102 may enter the following input: "@John Doe." As the application 130 receives the input, the input is directed onto a page of the document 114 or into a comment in the document at least until a complete trigger entry has been received. In this example, the trigger entry 122 is "@". Upon receiving the "@," the application 130 may determine that a trigger entry 122 has been received, and may then determine that the received trigger entry is associated with an auto-share command. The trigger entry 122 of "@" is just one example, and other characters, symbols, or sequences of characters may be used as trigger entries.

The application 130 then treats input received after the trigger entry 122 as a user identifier of a person with whom to share the document 114 (sometimes referred to herein as a "mentioned user" 132). In this example, the user identifier entry 124 is "John Doe." According to examples, the user identifier entry 124 may be a name, an e-mail address, a username, or an alias associated with the mentioned user 132 within the online service 108 or collaboration and/or document management system (i.e., document system 110). These examples are not limiting, and further examples of user identifier entries 124 are within the scope of the present disclosure. In one example, the user identifier entry 124 is entered by the sharing user 102. In another example, the user identifier is selected from a list of users.

Upon receiving the trigger entry 122 and a user identifier entry 124, an auto-share system 128a,b (generally, 128) communicatively attached to the application 130 checks to see if the mentioned user 132 has access to the document 114. For example, the auto-share system 128 is illustrative of a software module, system, or device operative to perform seamless sharing of a document 114 with another user with whom the document is not shared. In some examples, the auto-share system 128b is stored and executed locally on the client device 104. In other examples, the auto-share system 128a lives in the online service 108 rather than on the client device 104. According to an aspect, the auto-share system 128 performs a permissions check to determine whether the mentioned user 132 has user access permissions 116 to the document 114. In some examples, the auto-share system 128 makes an application programming interface (API) call to the server 112 to interrogate the server for user access permissions 116 information.

In response, the auto-share system 128 receives a permissions query response, wherein the response indicates whether the mentioned user 132 has user access permissions 116 to the document 114. According to an example, if the mentioned user 132 has user access permissions 116, the response indicates a type of user access permissions 116 the mentioned user 132 has. According to an aspect, when the mentioned user 132 has user access permissions 116 to the document 114, the auto-share system 128 is operative to generate a request to send a notification to the mentioned user 132. According to examples, the notification is an electronic notification, such as an email, a text message, an instant message, etc. In one example, the notification indicates that the mentioned user was mentioned in the document 114. In another example, the notification includes a name of the document 114. In another example, the notification includes a link to the document 114. According to an aspect, when the trigger entry 122 is added to a comment, the notification includes the comment content.

In some examples, a determination is made that the mentioned user 132 does not have user access permissions 116 to the document 114. In such examples, mentioning someone in a document 114 to which that person does not have access is likely an oversight. According to an aspect, when the mentioned user 132 does not have user access permissions 116 to the document, the auto-share system 128 is enabled to streamline the sharing experience by automatically generating a request to assign user access permissions 116 to the mentioned user 132 for the document 114.

According to an example, prior to generating the request to assign user access permissions 116 to the mentioned user 132 for the document 114, the auto-share system 128 is further operative to perform a second permissions check to determine whether the sharing user (i.e., client user A 102) has invite permissions. For example, the auto-share system 128 performs a permissions check to determine whether the sharing user 102 has permissions to invite other users to view or edit the document 114. When the sharing user 102 has invite permissions, the auto-share system 128 is operative to generate a request to assign user access permissions 116 to the mentioned user 132 for the document 114. According to an example, the auto-share system 128 is further operative to generate a request to send a notification to the mentioned user 132 with a link to the document 114. According to an aspect, when the trigger entry 122 is included in a comment, the notification includes the content of the comment.

Alternatively, when the sharing user 102 does not have invite permissions, the auto-share system 128 is operative to provide a message to the sharing user 102 notifying the user that he/she does not have sharing permissions. According to an example, the auto-share system 128 is further operative to generate a request to send a notification to the mentioned user 132 comprising a link to the document 114. For example, the mentioned user 132 is enabled to utilize the link to request user access permissions 116 for the document 114.

When a sharing user 102 shares the document 114 with a mentioned user 132, the auto-share system 128 is operative to provide a notification to the sharing user 102 notifying the user that the document 114 is being shared with the mentioned user 132. According to an aspect, the notification is selectable, which when selected, provides functionalities for enabling the sharing user 102 to change user access permissions 116 if necessary. For example, the sharing user 102 may inadvertently share the document 114 with someone. Thus, the notification enables the sharing user 102 to quickly and easily make a quick and easy rectify his/her mistake. According to an example, when the sharing user 102 makes a change to user access permissions 116, the auto-share system 128 generates a request to make the user-selected user access permission changes.

In some examples, the document 114 may be an unsaved document, or may be locally saved on the client computing device 102. According to an aspect, when a trigger entry 122 is received in an unsaved document 114 or in a document that is locally saved on the client computing device 102, the auto-share system 128 is operative to generate and provide a notification to the sharing user 102 indicating that the document 114 needs to be uploaded to the document system 110 to enable sharing of the document with the mentioned user 132.

In some examples, a functionality is provided for enabling the sharing user 102 to upload the document 114 to the documents system 110 for storage in the storage repository 126. For example, when the sharing user 102 has one account with the document system 110, the auto-share system 128 is operative to provide a functionality, such as an "OK" button, which when selected, automatically uploads the document 114 to the user's account in the storage repository 126. As another example, when the sharing user 102 has more than one account with the document system 110, the auto-share system 128 is operative to provide functionality for allowing the sharing user 102 to select an account to upload the document 114. For example, a list of the user's accounts may be provided from which the sharing user 102 is enabled to select an account. Upon selection of an account, the auto-share system 128 is operative to upload the document 114 to the user's account in the storage repository 126. When the document 114 is uploaded to the documents system 110, the auto-share system 128 is further operative to automatically assign user access permissions to the mentioned user 132, and generate a request to send a notification to the mentioned user 132 comprising a link to the document 114.

Figure 2A:
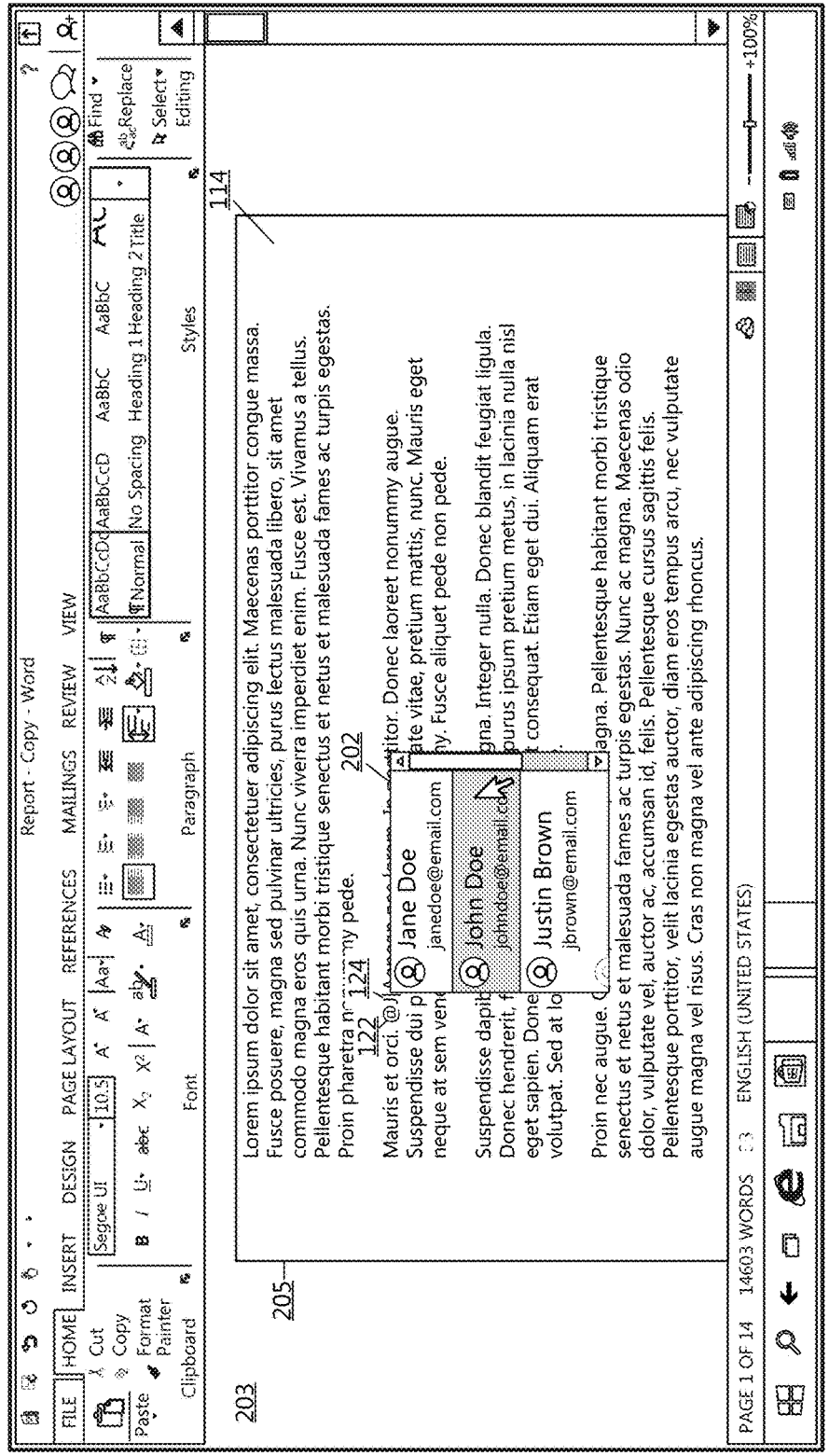
FIG. 2A is an illustration of an example user interface display showing user input on a document page including a trigger entry and a user identifier entry for automatically sharing a document.

Example interfaces generated by aspects of the auto-share system 128 are described throughout, including with respect to FIGS. 2A-3C. With reference now to FIG. 2A, an example user interface display 200 generated by aspects of an application 130 and displayed by the client computing device 104 is shown. In the illustrated example, the application 130 is a word processing application. As illustrated, the display 200 includes a toolbar, and a content region display area 203. The content region display area 203 operates to display one or more content regions from a document 114. In some examples, a user 102 can interact with and modify the content region that is displayed by adding, removing, repositioning, or otherwise modifying various content elements of the content region display area 203.

In the illustrated example, the content region display area 203 displays a page 205 from an example document 114. The page 205 is an example of a content authoring canvas. Other examples of content authoring canvases include slides and spreadsheets. In some aspects, the content region display area 203 displays a portion of a page rather than a whole page. Alternatively or additionally, the content region display area 203 may display multiple pages.

In the illustrated example, the page 205 includes textual content and the trigger entry 122. The textual content represents text the user 102 or another user has added to the page 205. In aspects, various techniques may be used to add text to the page 205. For example, a user may type some or all of the characters in the textual content using a keyboard, such as a physical keyboard or a virtual (or soft) keyboard that is generated and displayed on the display 200. Alternatively or additionally, a user may enter some or all of the textual content via copy and paste, voice commands via a device microphone, handwritten commands via a stylus, pen, or other writing implement, and/or other suitable commands.

With reference still to FIG. 2A, a user is performing an inline auto-share of the document 114, wherein an inline auto-share is an example of an inline command. The trigger entry 122 is a user input that the application 130 recognizes as being associated with an inline command. In some aspects, the trigger entry 122 is a sequence of characters that are input into the page 205. In the example shown, the trigger entry 122 is "@." Additionally or alternatively, in some aspects, the trigger entry 122 is a combination of keystrokes that do not necessarily result in characters being input on the page 205. For example, in some aspects, a combination of the ctrl key and at least one other key is recognized as a trigger entry 122. Other aspects are possible as well.

In some aspects, after the user 102 inputs the trigger entry 122, the user may then enter additional input, such as textual input. As described above, the application 130 (and auto-share system 128) treats input received after the trigger entry 122 as a user identifier entry 124, identifying a person with whom the user 102 wants to share the document 114. In some examples, the user 102 enters a user's name, username, alias, email address, or other user identifier. In other examples and as illustrated in FIG. 2A, when the user starts to input a user identifier entry 124, a popup window is displayed including a list 202 of people from which the user is enabled to select. According to an aspect, the user is enabled to continue typing fluidly without having to manually open a dialog.

In one example, the list is filtered as the user types. In the illustrated example, the user 102 starts to enter a user identifier entry 124 with a textual input of a "J." In response, the auto-share system 128 performs an action of displaying a popup window for displaying a list 202 of users based on the user's input. For example, based on the user's input of a "J" after the trigger entry 122, the list 202 is filtered to people with user identifiers (e.g., name, username, alias, email) that start with a "J." Also as illustrated, the user 102 selects a person from the list, "John Doe," as the person with whom the user wants to share the document 114. When a user identifier is entered or when a person is selected from the list 202, the entered input or selection is identified as the user identifier entry 124.

Figure 2B:
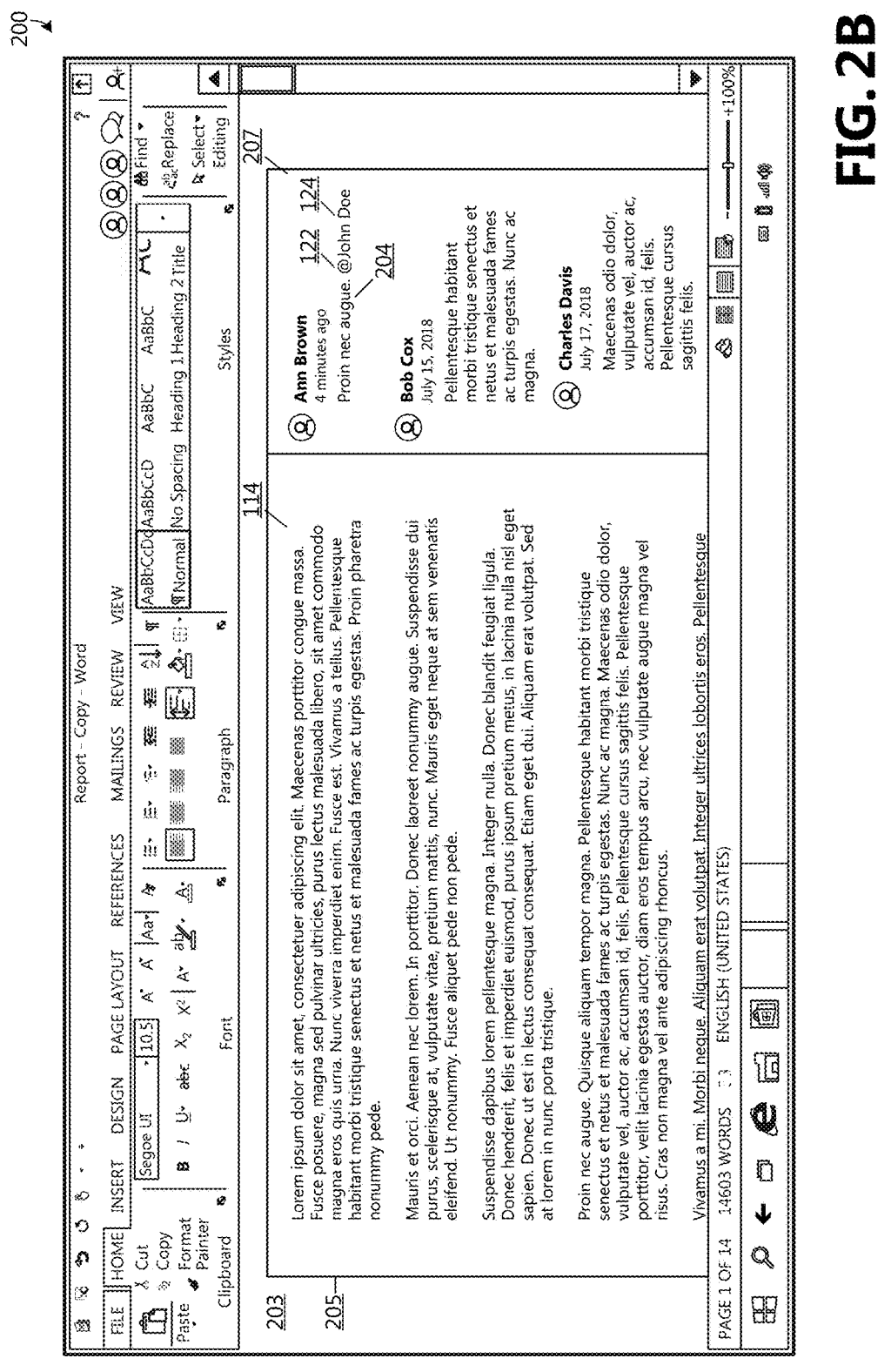

With reference now to FIG. 2B, the example user interface display 200 of FIG. 2A is shown, wherein the display 200 further includes a comments pane 207. According to an aspect, the comments pane 207 operates to display users' comments 204, wherein a comment is a note or annotation that an author or reviewer can add to a document 114. In some examples and as illustrated, the comments pane 207 further operates to receive comment content. In other examples, comment content is received in a comment bubble, or in another region provided in the display 200. According to examples, comment content is received upon selection of new comment functionality. There may be various methods for selecting the new comment functionality, for example, via selecting a tool displayed in the toolbar, via a keyboard shortcut, via a spoken command, etc.

In the illustrated example, the user 102 is performing an inline auto-share of the document 114, wherein a trigger entry 122 is input into a comment 204. After the user 102 inputs the trigger entry 122, the user may then enter additional input, such as textual input. As described above, the application 130 (and auto-share system 128) treats input received after the trigger entry 122 as a user identifier entry 124, identifying the person with whom the user 102 wants to share the document 114. In some examples, when the user starts to input a user identifier entry 124, a popup window is displayed including a list 202 of people from which the user is enabled to select. According to an aspect, the user is enabled to continue typing fluidly without having to manually open a dialog.

Figure 2C:
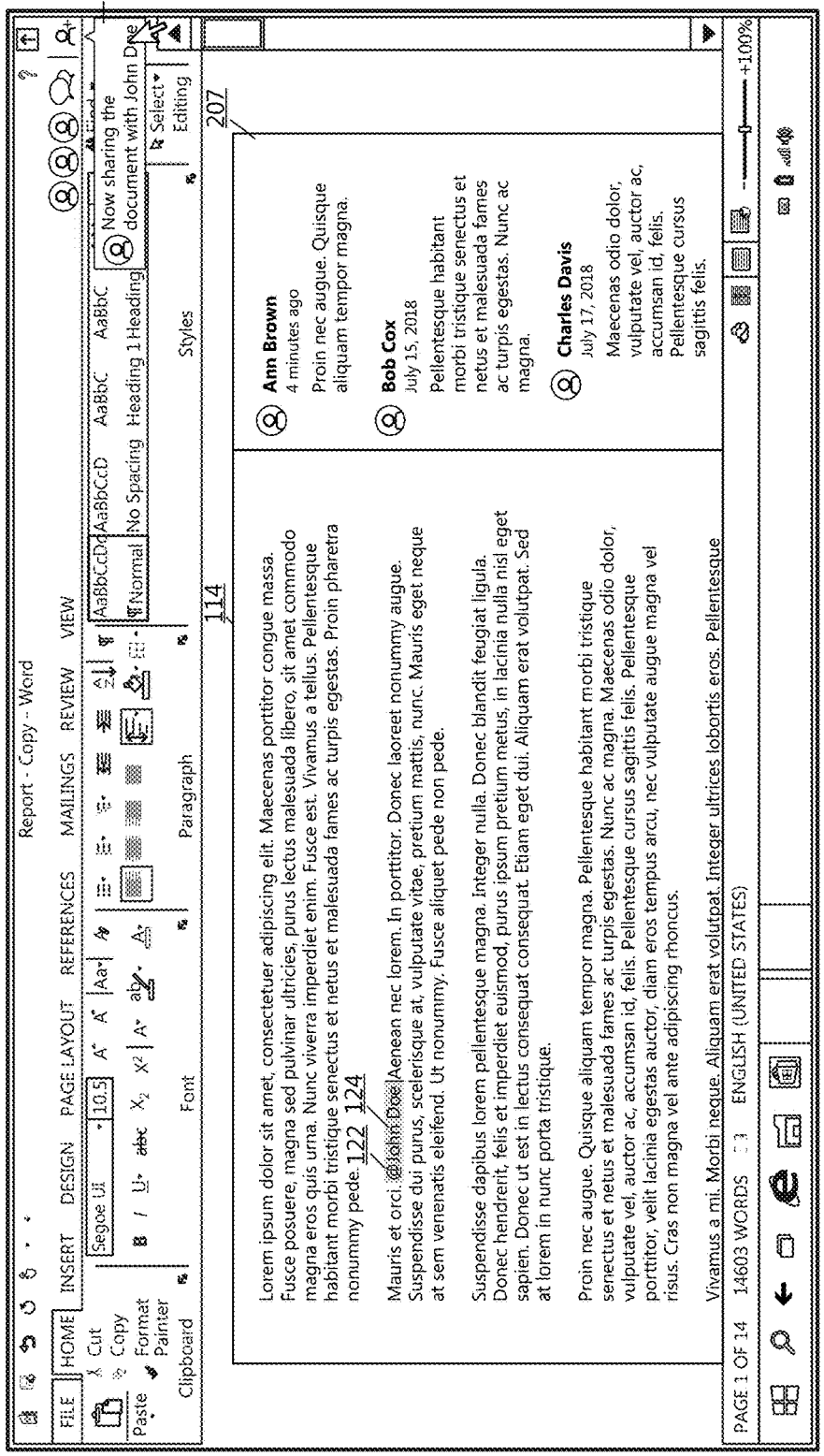
FIG. 2C is an illustration of an example user interface display including a notification for informing the sharing user that the document is being shared.

With reference now to FIG. 2C, the example user interface display 200 of FIGS. 2A and 2B is shown, wherein the display further includes a notification 206 for informing the sharing user 102 that the document 114 is being shared with the mentioned user 132 (i.e., person identified by the user identifier entry 124). In one example, when the trigger entry 122 and user identifier entry 124 are received, and when the mentioned user 132 has access to the document 114, the auto-share system 128 makes a request to send a notification to the mentioned user 132 including a link to the document 114 and a notification that he/she was mentioned in the document 114. If the trigger entry 122 was added to a comment 204, the notification includes the comment content.

In another example, when the trigger entry 122 and user identifier entry 124 are received, when the mentioned user 132 does not have access to the document 114, and when the sharing user 102 has permission to share the document 114 with a person who does not have access to the document, the auto-share system 128, the auto-share system 128 makes a request to give the mentioned user 132 user access permissions 116 to the document 114, and makes a request to send a notification to the mentioned user 132 including a link to the document 114 and a notification that he/she was mentioned in the document 114. If the trigger entry 122 was added to a comment 204, the notification includes the comment content.

According to an aspect and as illustrated in FIG. 2C, when the document 114 is shared with the mentioned user 132, a notification 206 is displayed by the auto-share system 128 to notify the sharing user 102 that the document 114 is being shared with the mentioned user 132. In one example, the notification 206 is a fly-out notification. According to an aspect, the notification 206 is selectable.

Figure 2D:
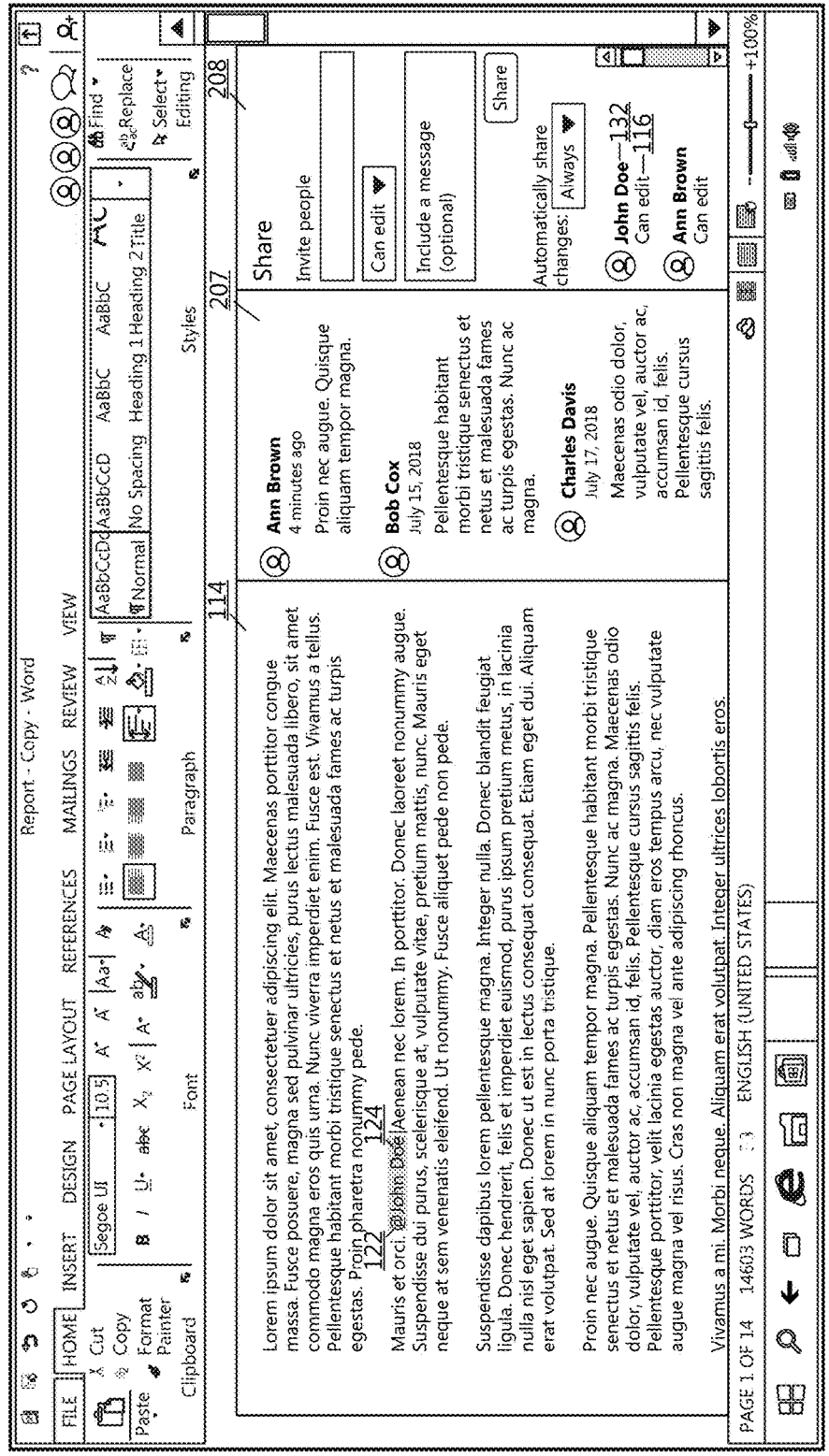
FIG. 2D is an illustration of an example user interface display including a share pane for enabling the sharing user to modify user access permissions.

For example and as illustrated in FIG. 2D, selection of the notification 206 causes a share pane 208 to be displayed. According to an aspect, the share pane 208 operates to provide various sharing functionalities, for example, for enabling the user 102 to invite other people to access the document 114, to assign specific user access permissions 116, and to make changes to user access permissions 116. In one example, if the sharing user 102 inadvertently shares the document 114 with someone (e.g., enters or selects an unintended user via the user identifier entry 124), the sharing user 102 is enabled to quickly and easily modify the user access permissions 116 afforded to the user. According to an aspect, when the sharing user 102 selects to make a change to a mentioned user's 132 user access permissions 116, the auto-share system 128 communicates the changes for modifying the user access permissions 116 stored in the document system 110.

Aspects of an online document system 110 enable users to share and collaborate on documents 114. Without the online document system 110, users can share a document 114 with others by sending the document as an email attachment. However, doing this creates multiple versions of the same document, which can be difficult to manage. When sharing a document 114 utilizing the online document system 110, users are enabled to give others access to the same document 114. Accordingly, the sharing user 102 and the people the sharing user shares the document 114 with are enabled to edit the same document without having to keep track of multiple versions. According to an aspect, to share a document 114 using auto-share functionalities, the document needs to be saved in the sharing user's online storage repository 126 of the document system 110.

Figure 3A:
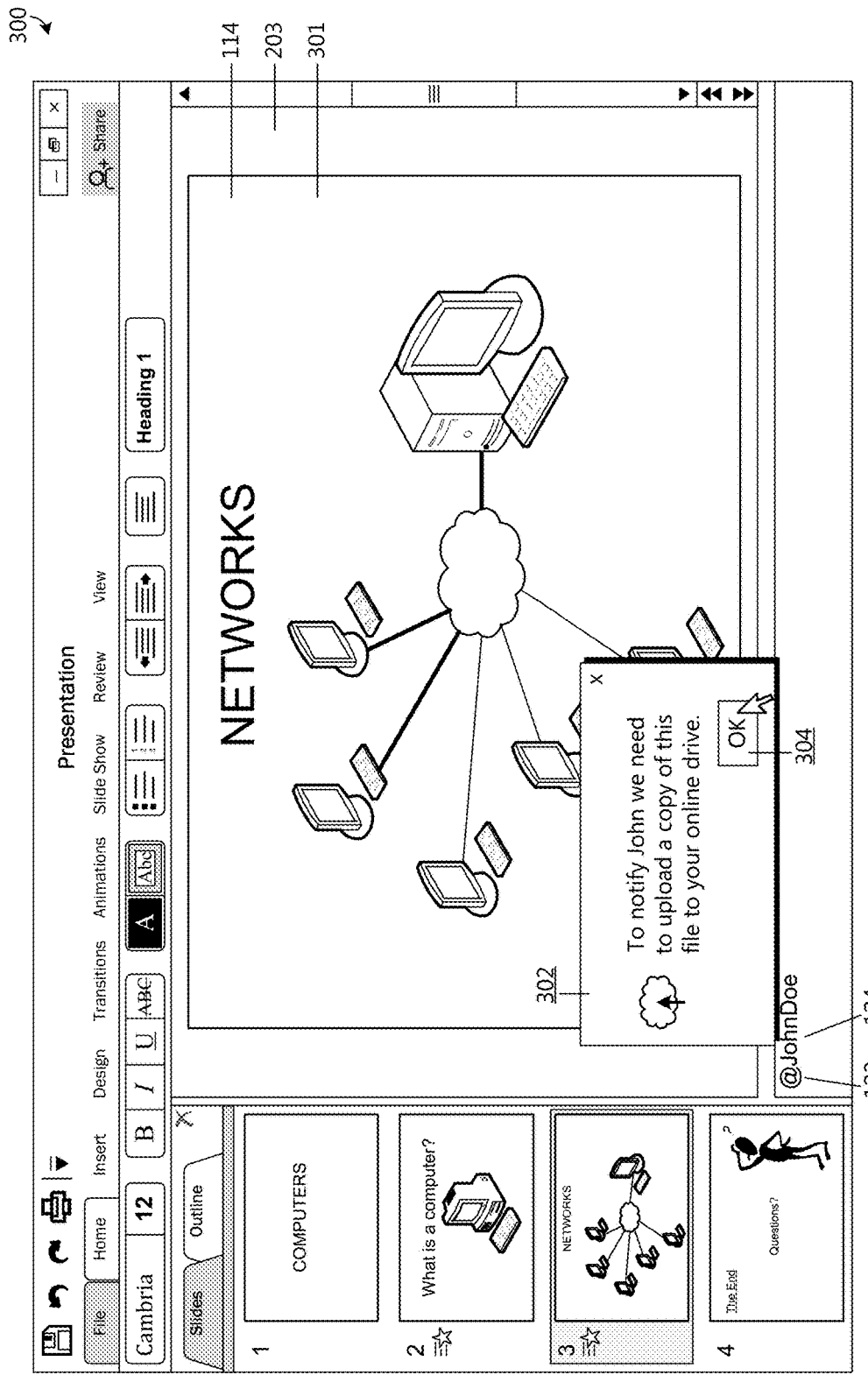
FIG. 3A is an illustration of an example user interface display including a notification that includes a functionality for enabling the sharing user to upload the document to the document system.

With reference now to FIG. 3A, an example user interface display 300 generated by aspects of an application 130 and displayed by the client computing device 104 is shown. In the illustrated example, the application 130 is a slide presentation application. The content region display area 203 operates to display one or more content regions from a document 114. In the illustrated example, the content region display area 203 displays a slide 301 from an example document 114. The slide 301 is an example of a content authoring canvas.

In the illustrated example, the document is not saved or is locally saved on the user's client device 102. And the sharing user 102 tries to share the document 114 using auto-share functionalities. For example, the sharing user 102 may input a trigger entry 122 and a user identifier entry 124 for auto-sharing the unsaved or local document 114 with a person associated with the user identifier entry 124. In response, the auto-share system 128 generates and displays a notification 302 to the sharing user 102 indicating that the document 114 needs to be uploaded to the document system 110 to enable auto-sharing of the document with the mentioned user 132. The notification 302 illustrated in FIG. 3A is an example of a notification that may be displayed to a sharing user 102 with a single account with the document system 110. In examples, the notification 302 includes a user-selectable control (e.g., an "OK button 304) that, when selected, automatically uploads the document 114 to the user's account in the storage repository 126.

Figure 3B:
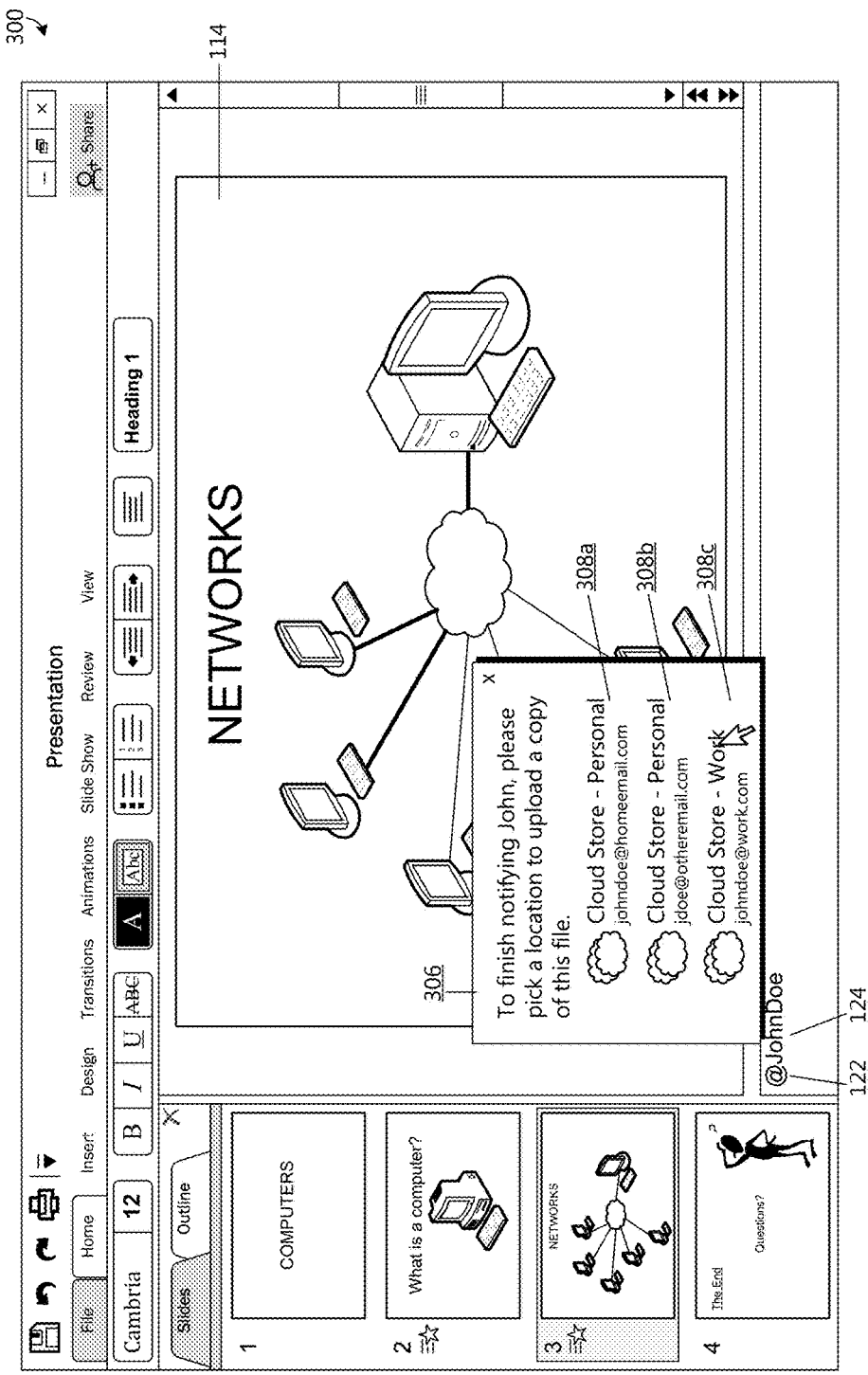
FIG. 3B is an illustration of an example user interface display including a notification that includes a functionality for enabling the sharing user to select an online storage location for uploading the document to the document system.

As another example, when the sharing user 102 has more than one account with the document system 110, the auto-share system 128 generates and displays a different notification, such as the example notification 306 illustrated in FIG. 3B. The example notification 306 illustrated in FIG. 3B includes a functionality for allowing the sharing user 102 to select an account to upload the document 114. For example, the notification 306 includes a list of the user's accounts 308a-c (collectively, 308), wherein the listed user's accounts 308 are selectable. According to an aspect, when a user account 308 is selected, the auto-share system 128 uploads the document 114 to the selected account in the storage repository 126. Further, when the document 114 is uploaded to the documents system 110, the auto-share system 128 automatically assigns user access permissions to the mentioned user 132, and generates a request to send a notification to the mentioned user 132 including a link to the document 114.

Figure 3C:
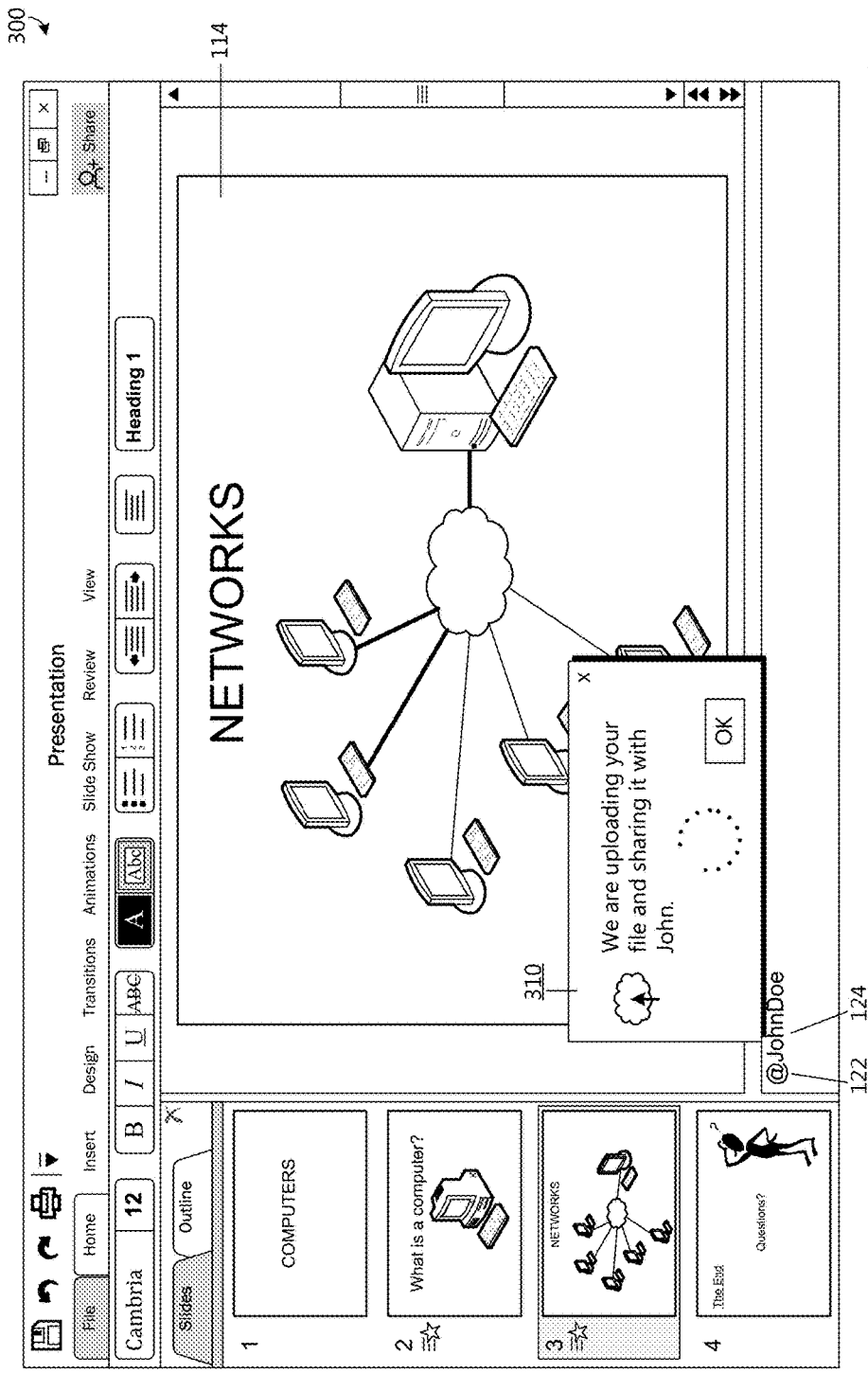
FIG. 3C is an illustration of an example user interface display including a notification for informing the sharing user that the document is being uploaded to an online storage location and will be shared with a mentioned user.

With reference now to FIG. 3C, an example user interface display 300 is shown including an example of a notification 310 informing the sharing user 102 of a status of uploading the document 114. For example, when the sharing user 102 selects to upload the document 114 to the documents system 110, the auto-share system 128 generates and displays a notification 310 that lets the sharing user know that the document 114 is being uploaded to the user's account in the storage repository 126 and will be shared with the mentioned user 132 associated with the user identifier entry 124. As should the appreciated, the user interface displays 200, 300 illustrated in FIGS. 2A-3C are for purposes of illustration. Aspects may be implemented in many different forms and should not be construed as limited to the illustrated examples.

Figure 4:
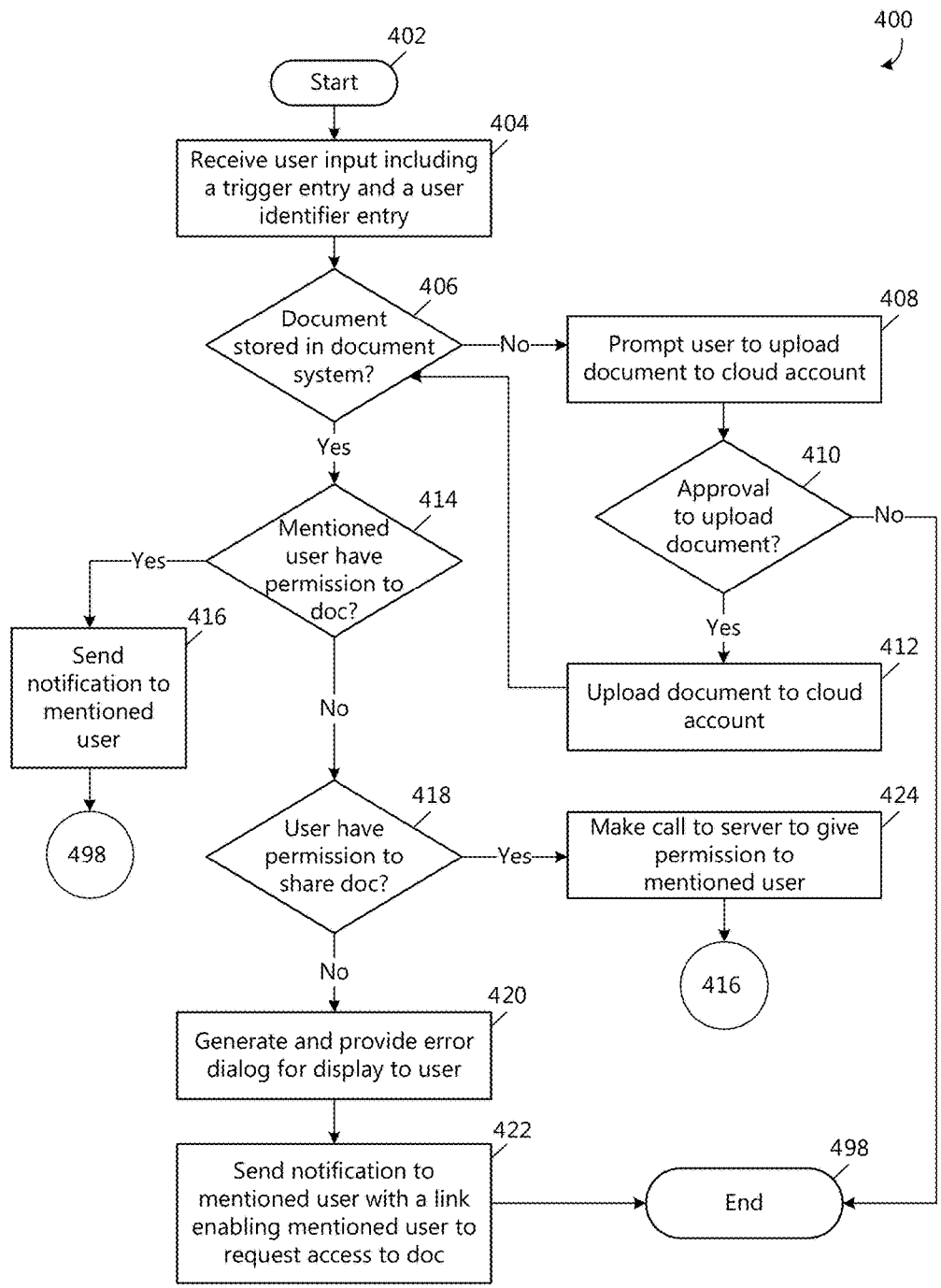
FIG. 4 is a flow chart showing general stages involved in an example method for providing inline command functionality for automatically sharing a document with user access permissions.

Having described an operating environment and various user interface display examples with respect to FIGS. 1-3C, FIG. 4 is a flow chart showing general stages involved in an example method 400 for providing inline command functionality for automatically sharing a document 114 with user access permissions 116. With reference now to FIG. 4, the method 400 begins at start OPERATION 402, and proceeds to OPERATION 404, where user input is received including a trigger entry 122 and a user identifier entry 124. In one example, the user input is received within a content authoring canvas 205, such as in page of a document, a spreadsheet of a spreadsheet document, a slide of a presentation document, etc. In another example, the user input is received within a comment 204 in the document 114. As described previously, the trigger entry may comprise one or more characters input by the sharing user 102 through keystrokes. Also as described above, the user identifier entry 124 may comprise a user's name, username, alias, email address, or other identifier input or selected by the sharing user 102. In examples, the trigger entry 122 and the user identifier entry 124 are displayed in the content authoring canvas 205.

The method 400 proceeds to DECISION OPERATION 406, where a determination is made as to whether the document 114 is saved to the document system 110 for enabling collaboration and sharing of the document with other users. If a determination is made that the document 114 is not saved or is locally saved to the sharing user's client computing device 104, the method 400 proceeds to OPERATION 408, where the sharing user 102 is prompted to upload the document 114 to the user's cloud storage repository 126, for example, by generating and presenting a notification 302,306, such as the example notifications illustrated in FIGS. 3A and 3B.

The method 400 proceeds from OPERATION 408 to DECISION OPERATION 410, where a determination is made as to whether the sharing user 102 approves to upload the document 114. For example, the sharing user 102 may select a user-selectable control, such as an "OK button 304) to enable uploading and storing the document 114 to the document system 110. In another example, such as when the sharing user 102 has more than one document system 110 account, the user may select an account 308 from a listing of the user's accounts to which to upload and store the document 114. When a determination is made that approval to upload the document 114 is received, the method 400 proceeds to OPERATION 412, where the document 114 is uploaded to the user's cloud storage repository 126.

When a positive determination is made at DECISION OPERATION 406 (i.e., that the document 114 is stored in the document system 110), the method 400 proceeds to DECISION OPERATION 414, where a determination is made as to whether the mentioned user 132 (i.e., the person associated with the user identifier entry 124) has access to the document 114. For example, upon receiving the trigger entry 122 and user identifier entry 124, the auto-share system 128 generates and executes a permissions query based on the user identifier entry 124, requesting permissions information from the server 112 for making a determination as to whether the mentioned user 132 has user access permissions 116 to the document 114.

When a determination is made that the mentioned user 132 has access to the document 114, the method 400 proceeds to OPERATION 416, where a notification is sent to the mentioned user 132 informing the mentioned user that he/she was mentioned in the document 114. In some examples, a link to the document 114 is included in the notification. Further, if the mentioned user 132 was mentioned in a comment 204 (e.g., the trigger entry 122 and user identifier entry 124 identifying the mentioned user 132 were input into a comment 204), the notification further includes the content of the comment.

When a determination is made at DECISION OPERATION 414 that the mentioned user 132 does not have user access permissions 116 to the document 114, the method 400 proceeds to DECISION OPERATION 418, where a determination is made as to whether the sharing user 102 has sharing permissions. For example, the auto-share system 128 generates and executes a permissions query based on the sharing user 102, wherein the auto-share system 128 requests permissions information from the server 112 for making a determination as to whether the sharing user 102 is able to share the document 114 with someone who does not have user access permissions 116 to the document 114.

When a determination is made that the sharing user 102 has sharing permissions, the method 400 proceeds to OPERATION 424, where the auto-share system 128 makes a call to the server 112 to assign user access permissions 116 to the mentioned user 132 for the document 114. The method 400 continues to OPERATION 416, where a notification is sent to the mentioned user 132 informing the mentioned user that he/she was mentioned in the document 114. In some examples, a link to the document 114 is included in the notification. Further, if the mentioned user 132 was mentioned in a comment 204 (e.g., the trigger entry 122 and user identifier entry 124 identifying the mentioned user 132 were input into a comment 204), the notification further includes the content of the comment.

When a determination is made that the sharing user 102 does not have sharing permissions at DECISION OPERATION 418, the method 400 proceeds to OPERATION 420, where the auto-share system 128 generates and displays an error dialog informing the user that he/she does not have sharing permissions. The method 400 continues to OPERATION 422, where a notification is provided to the mentioned user 132 informing the mentioned user that he/she was mentioned in the document 114, that he/she does not have access to the document 114, but can request access to the document 114. In some examples, a link to the document 114 is included in the notification, wherein selection of the link makes a call to the server 112 to request user access permissions for the document 114. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
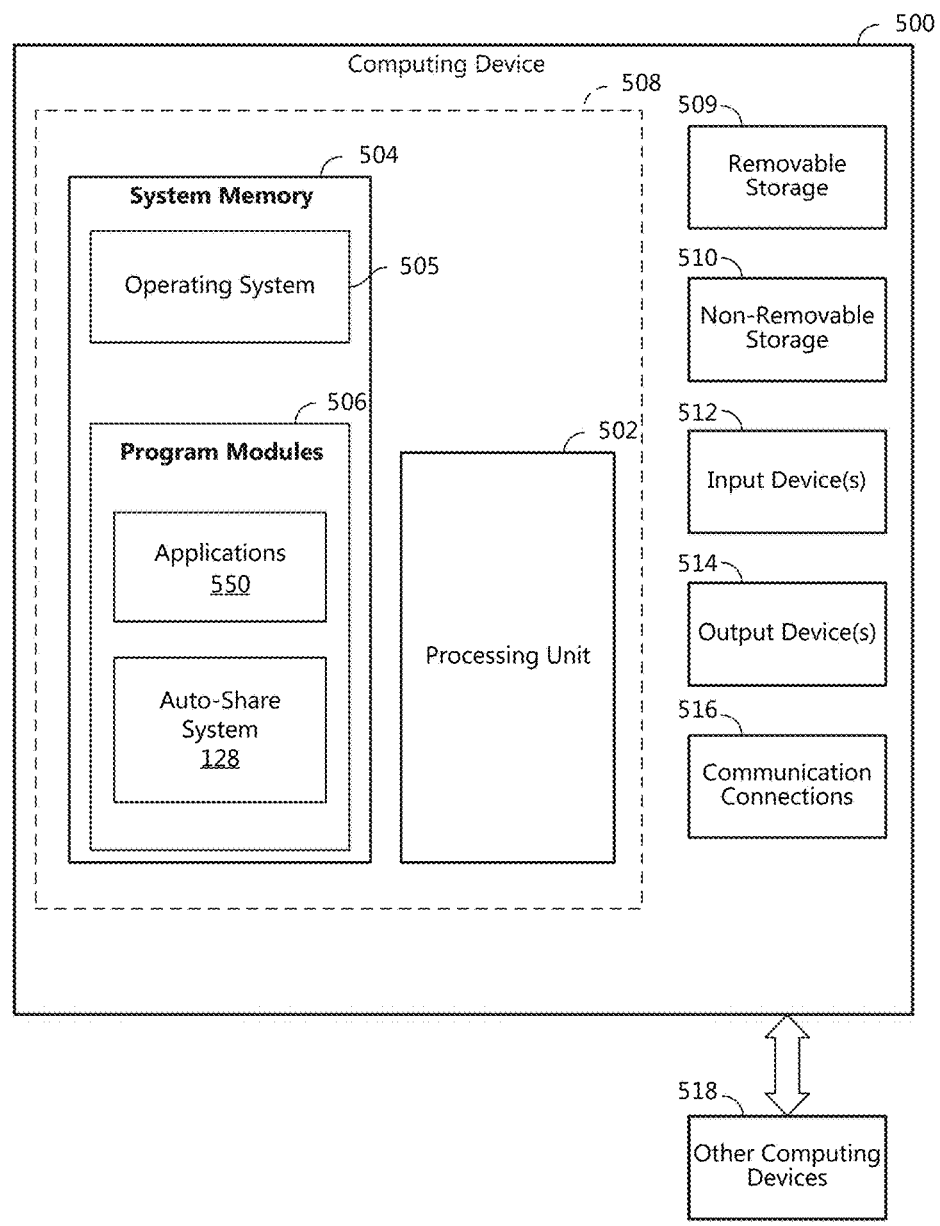
FIG. 5 is a block diagram illustrating example physical components of a computing device.
Figure 6A:
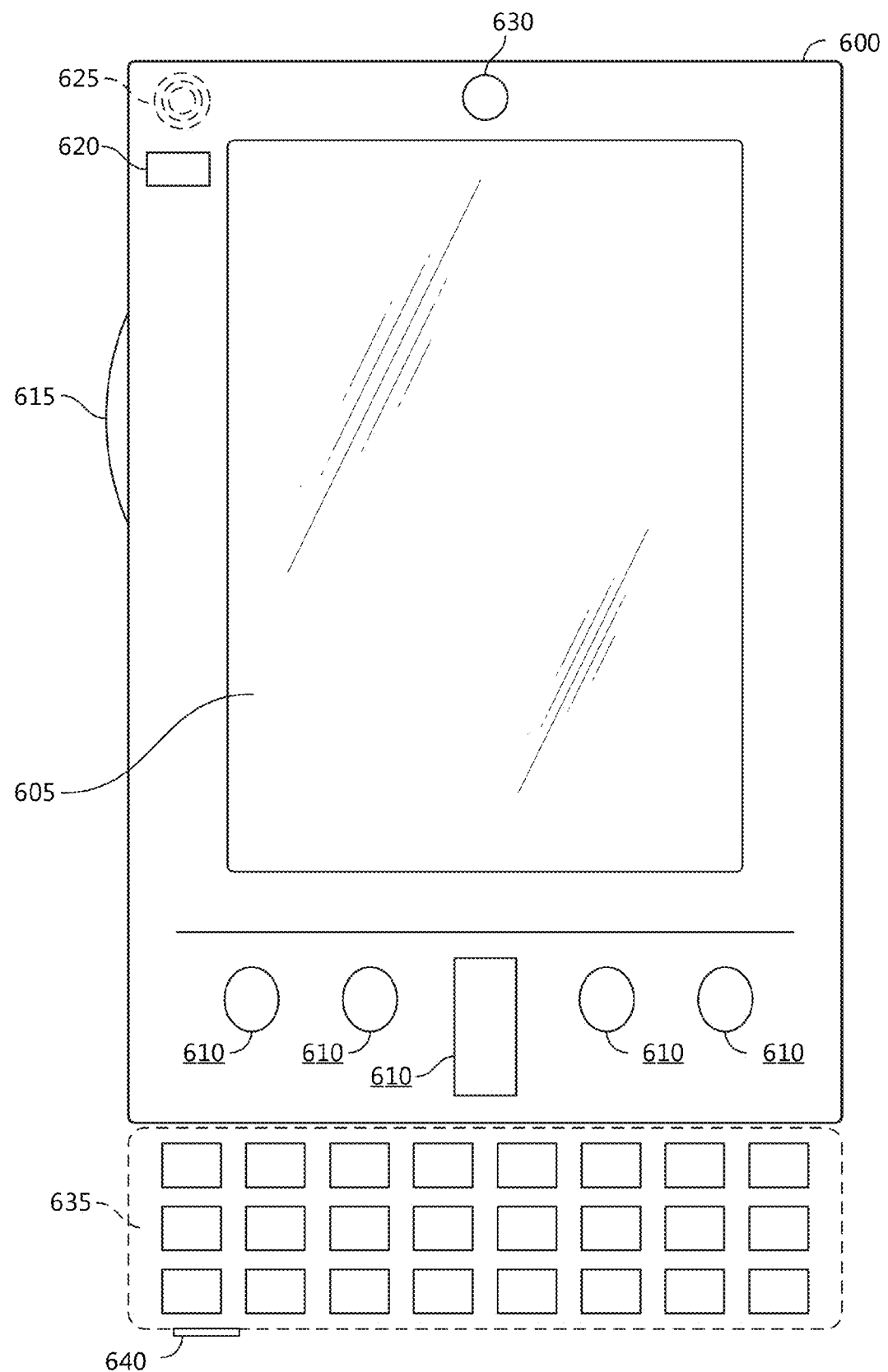
FIGS. 6A and 6B are simplified block diagrams of a mobile computing device.
Figure 6B:
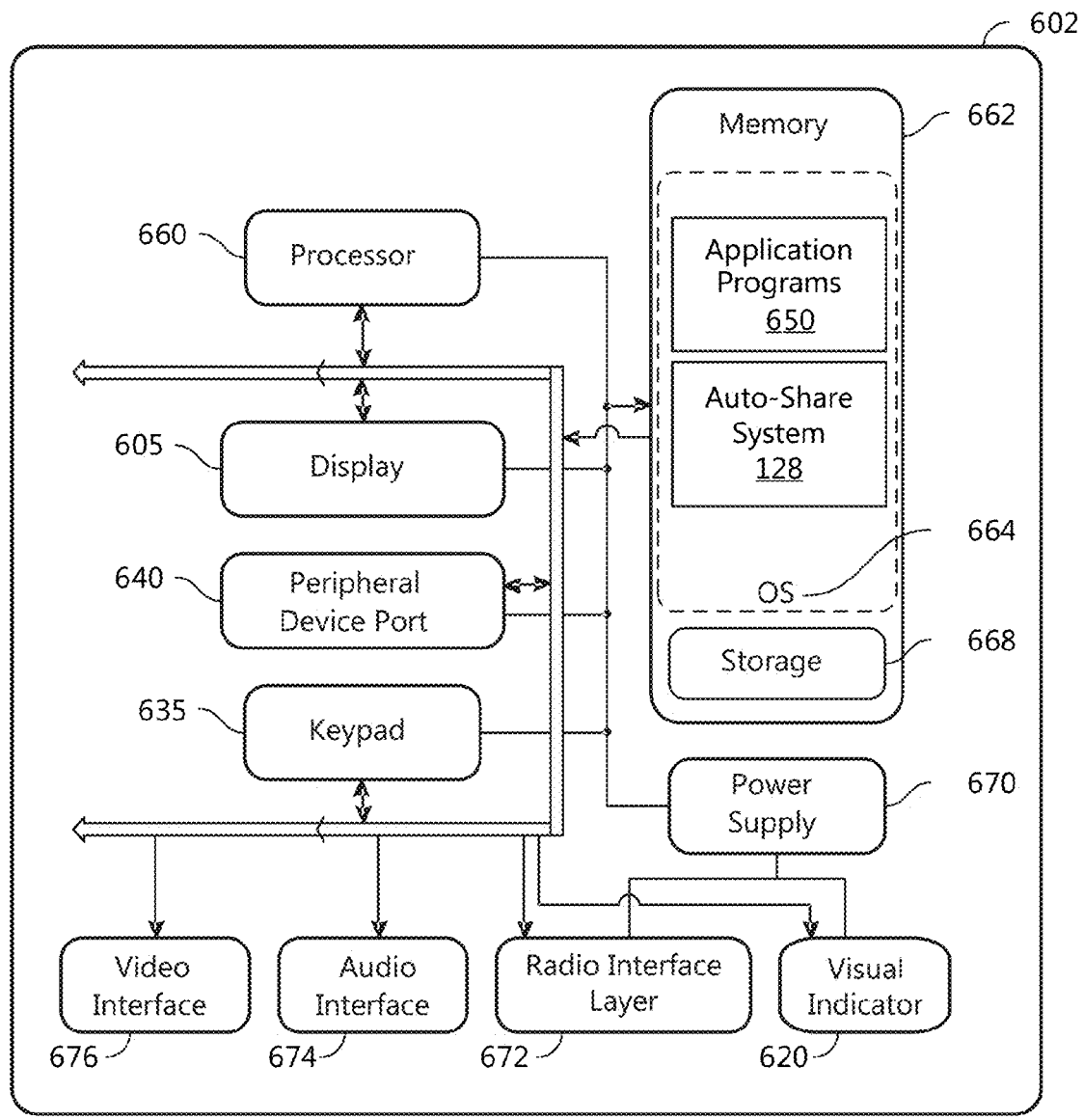
Figure 7:
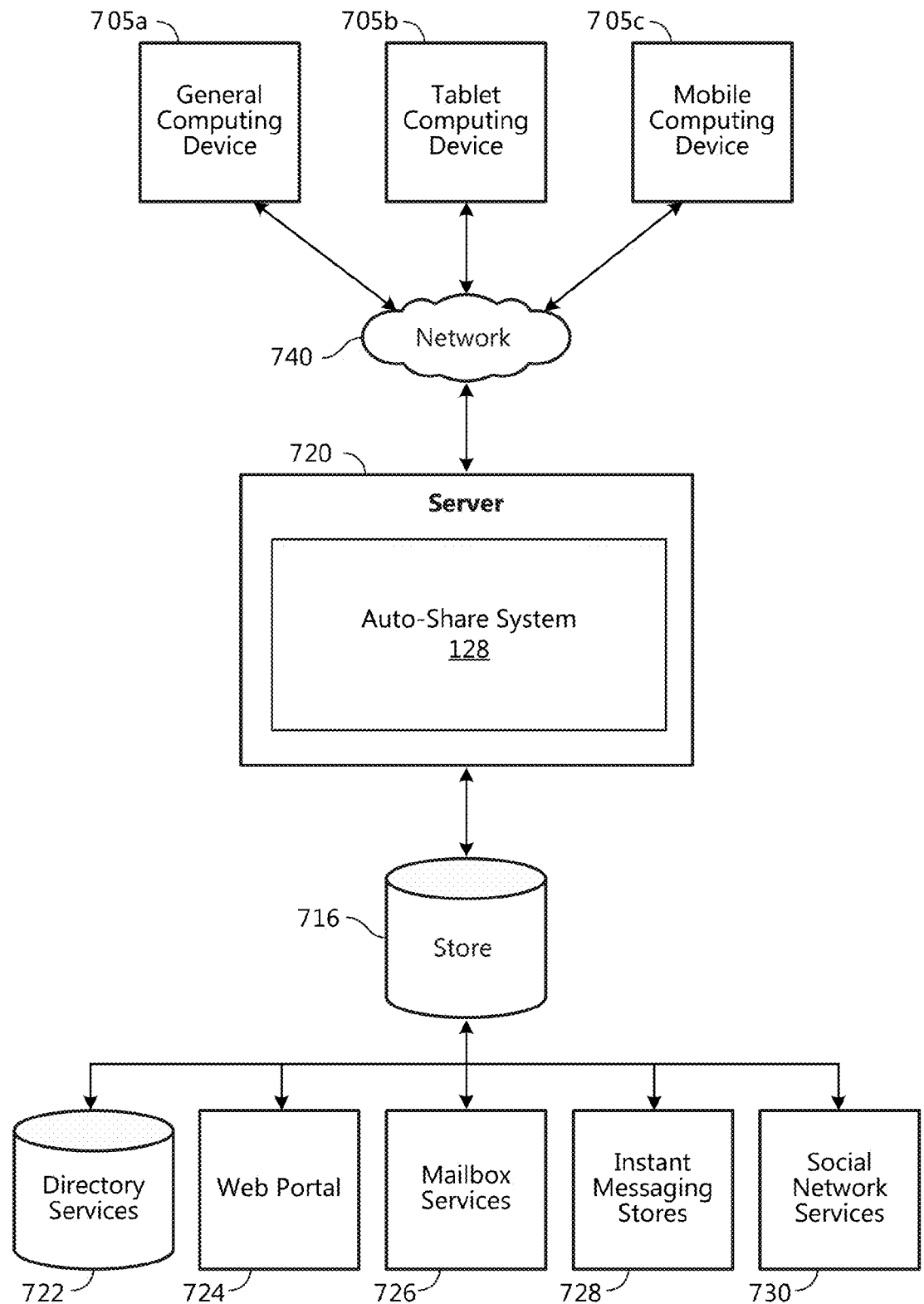
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the auto-share system 128. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., auto-share system 128) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the auto-share system 128 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing inline command functionality for automatically sharing a document 114 with user access permissions 116 as described above. Content developed, interacted with, or edited in association with the auto-share system 128 is enabled to be stored in different communication channels or other storage types. For example, various documents may be stored using a directory service 722, a web portal 724, a mailbox service 726, an instant messaging store 728, or a social networking site 730. The auto-share system 128 is operative to use any of these types of systems or the like for providing inline command functionality for automatically sharing a document 114 with user access permissions 116, as described herein. According to an aspect, a server 720 provides the auto-share system 128 to clients 705a,b,c. As one example, the server 720 is a web server providing the auto-share system 128 over the web. The server 720 provides the auto-share system 128 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for automatically sharing an electronic document with user access permissions from within an electronic document user interface (UI) of an electronic document application, the method comprising:
    displaying content of the electronic document in the electronic document UI;
    receiving input associated with the electronic document, wherein the input is in the form of content of the electronic document or content of a comment, via the electronic document UI, from a first user comprising a trigger entry and a user identifier entry identifying a second user;
    based on having received the trigger entry and user identifier identifying the second user, executing a first permissions query for user access permissions for the second user to the electronic document; and
    receiving permissions query results for the first permissions query;
        when the permissions query results for the first permissions query indicate that the second user has user access permissions to the electronic document, sending a notification to the second user comprising a link to the electronic document; and
        when the permissions query results for the first permissions query indicate that the second user does not have user access permissions to the electronic document, executing a second permissions query to determine if the first user has sharing permissions;
        when the permissions query results for the second permissions query indicate that the first user has sharing permissions:
            displaying within the electronic document UI, while the electronic document remains displayed, an element enabling the first user to assign user access permissions to the electronic document;
            when an indication is received, via the element of the electronic document UI, that the first user has assigned user access permissions to the electronic document to the second user, sending the notification to the second user comprising the link to the electronic document.

2. The method of claim 1, further comprising: when the permissions query results for the second permissions query indicate that the first user does not have sharing permissions:
    generating and displaying, within the electronic document UI while the electronic document remains displayed, an error notification to the first user; and
    sending a request notification to the second user including a request link, wherein selection of the request link enables the second user to request user access permissions to the electronic document.

3. The method of claim 1, further comprising: when the trigger entry and user identifier entry are included in the comment, including the comment in the notification to the second user.

4. The method of claim 1, wherein receiving the trigger entry comprises receiving a character, symbol, or sequence of characters designated as the trigger entry.

5. The method of claim 1, wherein receiving the user identifier entry identifying the second user comprises:
    receiving textual input associated with a name, username, alias, or email address of the second user;
    generating and displaying, within the electronic document UI while the electronic document remains displayed, a list of users based on the received textual input;
    filtering the list of users based on the received textual input as it is being received; and
    receiving an indication, via the electronic document UI, of a selection of the second user from the list of users.

6. The method of claim 1, wherein, when the first user has assigned user access permissions to the second user, the method further comprising: generating and displaying, within the electronic document UI while the electronic document remains displayed, a selectable notification to the first user informing the first user that the electronic document is being shared with the second user.

7. The method of claim 6, further comprising:
    receiving a selection of the selectable notification informing the first user that the electronic document is being shared with the second user; and
    generating and displaying, within the electronic document UI while the electronic document remains displayed, a share pane enabling the first user to make changes to user access permissions.

8. The method of claim 1, wherein prior to generating the first permissions query:
    making a determination as to whether the electronic document is saved to an online document system; and
    when it is determined that the electronic document is not saved to the online document system, prompting the first user to upload the electronic document, via the electronic document UI while the electronic document remains displayed, to the online document system, wherein uploading the electronic document to the online document system enables sharing of the electronic document.

9. The method of claim 8, wherein when the first user has more than one account with the online document system, generating and displaying, within the electronic document UI while the electronic document remains displayed, a list of the first user's accounts from which the first user is enabled to select an account to which to upload the electronic document.

10. A system for automatically sharing an electronic document with user access permissions from within an electronic document user interface (UI) of an electronic document application, the system comprising a computing device, the computing device comprising:
    at least one processing device; and
    at least one computer readable data storage device storing instructions that, when executed by the at least one processing device, cause the computing device to:
        display content of the electronic document in the electronic document UI;
        receive user input associated with the electronic document, wherein the input is in the form of content of the electronic document or content of a comment, via the electronic document UI, from a first user comprising a trigger entry and a user identifier entry identifying a second user;
        based on having received the trigger entry and user identifier identifying the second user, execute a first permissions query for user access permissions for the second user to the electronic document; and
        receive permissions query results for the first permissions query;
            when the permissions query results for the first permissions query indicate that the second user has user access permissions to the electronic document, send a notification to the second user comprising a link to the electronic document; and
            when the permissions query results for the first permissions query indicate that the second user does not have user access permissions to the electronic document, execute a second permissions query to determine if the first user has sharing permissions;
                when the permissions query results for the second permissions query indicate that the first user has sharing permissions:
                    display, within the electronic document UI while the electronic document remains displayed, a sharing pane enabling the first user to assign user access permissions to the electronic document; and
                    when the indication is received, via the sharing pane of the electronic document UI, that that first user has assigned access permissions to the electronic document to the second user, send the notification to the second user comprising the link to the document.

11. The system of claim 10, wherein when the permissions query results for the second permissions query indicate that the first user does not have sharing permissions, the computing device is further caused to:
    generate and display, within the electronic document UI while the electronic document remains displayed, an error notification to the first user; and
    send a request notification to the second user including a request link, wherein selection of the request link enables the second user to request user access permissions to the electronic document.

12. The system of claim 10, wherein when the trigger entry and the user identifier entry are input in the comment, the computing device is further caused to include the comment in the notification to the second user.

13. The system of claim 10, wherein in receiving a user identifier entry identifying a second user, the computing device is caused to:
    receive textual input, via the electronic document UI, associated with a name, username, alias, or email address of the second user;
    generate and display, within the electronic document UI while the electronic document remains displayed, a list of users based on the received textual input;
    filter the list of users based on the received textual input as it is being received; and
    receive an indication, via the electronic document UI, of a selection of the second user from the list of users.

14. The system of claim 10, wherein, when the first user has assigned user access permissions to the second user, the computing device is further caused to generate and display, within the electronic document UI while the electronic document remains displayed, a selectable notification to the first user informing the first user that the electronic document is being shared with the second user.

15. The system of claim 14, wherein the computing device is further caused to:
    receive a selection of the selectable notification informing the first user that the electronic document is being shared with the second user; and
    generate and display, within the electronic document UI while the electronic document remains displayed, the share pane, the share pane enabling the first user to make changes to user access permissions.

16. The system of claim 10, wherein prior to generating the first permissions query, the computing device is further caused to:
    make a determination as to whether the electronic document is saved to an online document system; and
    when it is determined that the electronic document is not saved to the online document system, prompt the first user to upload the electronic document, via the electronic document UI while the electronic document remains displayed, to the online document system to enable sharing of the electronic document.

17. The system of claim 16, wherein when the first user has more than one account with the online document system, the computing device is further caused to generate and display, within the electronic document UI while the electronic document remains displayed, a list of the first user's accounts from which the first user is enabled to select an account to which to upload the electronic document.

* * * * *